United States Patent
West et al.

[11] Patent Number: 5,432,335
[45] Date of Patent: Jul. 11, 1995

[54] CHARGE-COUPLED DEVICE FOR SPECTROSCOPIC DETECTION

[75] Inventors: John S. West, Yardley, Pa.; Raymond W. Simpson, Hamilton Square, N.J.

[73] Assignee: Princeton Instruments, Inc., Trenton, N.J.

[21] Appl. No.: 189,579

[22] Filed: Mar. 14, 1994

[51] Int. Cl.$^6$ .............................................. H04N 3/14
[52] U.S. Cl. ................................. 250/208.2; 257/232
[58] Field of Search ............... 250/208.1, 208.2, 214.1, 250/214 R, 214 AG, 214 DC; 348/299, 300, 303, 304, 314; 257/232, 233, 240, 241, 239

[56] References Cited

U.S. PATENT DOCUMENTS

| | | |
|---|---|---|
| 3,851,096 | 11/1974 | Collins et al. . |
| 4,001,878 | 1/1977 | Weimer . |
| 4,165,539 | 8/1979 | Aichelmann, Jr. . |
| 4,237,383 | 12/1980 | Kosonocky et al. . |
| 4,490,744 | 12/1984 | Levine . |
| 4,513,313 | 4/1985 | Kinoshita et al. . |
| 4,559,550 | 12/1985 | Koike et al. . |
| 4,641,963 | 2/1987 | Levine . |
| 4,694,316 | 9/1987 | Chabbal . |
| 4,744,057 | 5/1988 | Descure et al. ..................... 257/232 |
| 4,750,042 | 6/1988 | Murayama et al. . |
| 4,774,586 | 9/1988 | Koike et al. . |
| 4,807,037 | 2/1989 | Iesaka et al. . |
| 4,837,630 | 6/1989 | Ueda . |
| 4,862,274 | 8/1989 | Cazaux . |
| 4,908,518 | 3/1990 | Losee et al. . |
| 4,949,183 | 8/1990 | Stevens . |
| 4,987,466 | 1/1991 | Shibata et al. . |
| 5,040,071 | 8/1991 | Stevens . |
| 5,283,450 | 2/1994 | Harada ............................. 257/232 |

Primary Examiner—David C. Nelms
Assistant Examiner—John R. Lee
Attorney, Agent, or Firm—Smith-Hill and Bedell

[57] ABSTRACT

A CCD comprises a sensing array, a readout register extending adjacent an edge of the sensing array, and an output cell at an output end of the readout register. The output cell has first and second sub-cells with the first sub-cell being between the readout register and the second sub-cell. The first sub-cell of the output cell is of lower capacity than the second sub-cell and is separated from the second sub-cell by a potential barrier.

23 Claims, 5 Drawing Sheets

CHARGE-COUPLED DEVICE FOR SPECTROSCOPIC DETECTION

CROSS-REFERENCE TO RELATED APPLICATION

Some of the subject matter that is disclosed in this application is also disclosed in co-pending patent application No. 08,189,577, filed concurrently herewith, the disclosure of which is hereby incorporated by reference herein.

BACKGROUND OF THE INVENTION

This invention relates to a charge-coupled device for spectroscopic detection.

Figure 1:
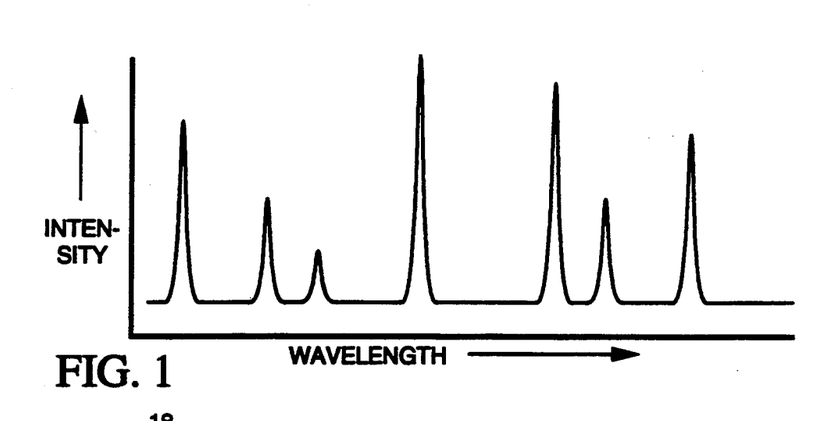
FIG. 1 is a graph illustrating light intensity as a function of position along the wavelength axis in the image plane of an emission spectroscope.

In emission spectroscopy, a specimen is heated to incandescence and the light emitted by the specimen is collimated, dispersed in accordance with wavelength, and focused in an image plane. The intensity of light in the image plane varies along a wavelength axis, and FIG. 1 illustrates variation of intensity in the image plane with position along the wavelength axis. In absorption spectroscopy, a beam of light is incident on an absorbent specimen, and the transmitted light is dispersed in accordance with wavelength and is focused in an image plane. In each case, the distribution of light intensity as a function of wavelength is dependent on the composition of the specimen.

Figure 2:
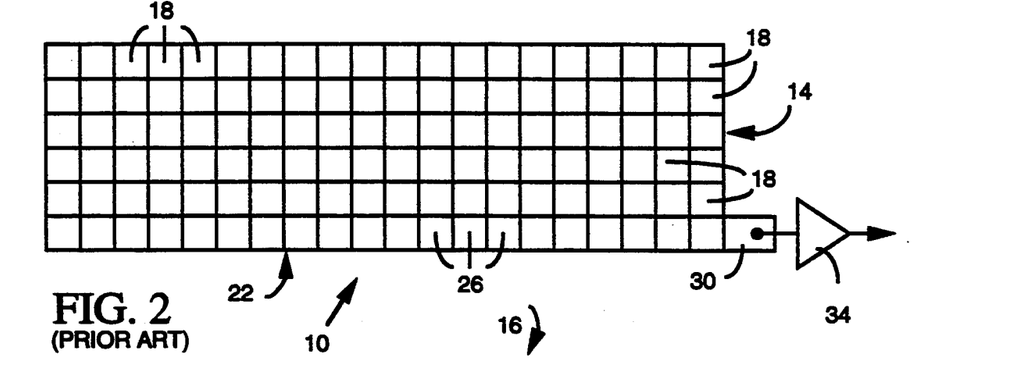
FIG. 2 is a diagrammatic plan view of the front surface of a CCD array for spectroscopic detection.

It is known to measure the distribution of light intensity as a function of wavelength in emission or absorption spectroscopy by use of a charge-coupled device (CCD). FIG. 2 illustrates schematically a known form of CCD 10. The CCD shown in FIG. 2 comprises a die made of monocrystalline silicon into which various impurities have been implanted using conventional integrated circuit fabrication techniques. The pattern of impurity type and concentration defines a rectangular sensing region 14 composed of multiple columns extending perpendicular to the longer dimension of the sensing region 14. For convenience, it will be assumed in the following discussion that wavelength varies along a horizontal axis and that the columns are vertical, as shown in FIG. 2.

A three-phase frame electrode structure 16 (FIG. 3) traverses the columns of the sensing region. The frame electrode structure is connected to a three-phase clock driver (not shown) that applies selected voltage levels to the electrodes and thereby establishes a potential profile as shown by the dashed line 19, dividing each column into multiple pixels 18. It will be understood that although the sensing region 14 shown in FIG. 2 is composed of only 100 pixels, a practical CCD for spectroscopic detection might have well over 100,000 pixels. Also, although, the pixels are shown in FIG. 2 as being square, this is not necessary.

The CCD is placed in the image plane of the spectrometer so that the longer dimension of the rectangular sensing region is disposed parallel to the wavelength axis of the spectrum provided by the spectrometer. Therefore, each column of pixels is associated with an interval in the wavelength range. Photons that are incident on a particular pixel of the sensing region result in generation of photoelectrons in the semiconductor die at a rate that depends on the intensity of light incident on the pixel, and photoelectrons that do not recombine with holes are retained in the pixel by potential barriers that bound the pixel. Thus, the size of the charge packet accumulated in a given column of pixels during an exposure interval is representative of the intensity of light within the wavelength range associated with that column, and the distribution of size of charge packets along the wavelength axis represents the distribution of light intensity as a function of wavelength in the light beam provided by the sample.

Along one horizontal edge of the rectangular sensing region there is a readout register 22. As shown in FIG. 2, the readout register extends parallel to the wavelength axis. The readout register comprises one charge transfer cell 26 for each column of pixels in the sensing region of the CCD. The readout register also comprises a so-called floating diffusion 30 at one end. The floating diffusion is coupled to a readout amplifier 34.

The clock driver enables voltages to be applied to the frame electrode structure in a sequence that allows the charge packet accumulated in each column of pixels during the exposure period to be transferred into the corresponding transfer cell 26 of the readout register 22. In addition, a readout electrode structure 38 overlies the transfer cells of the readout register and by clocking the electrodes of the readout electrode structure in ordered sequence, the charge packets in the readout register are transferred to the floating diffusion.

A so-called last cell, controlled by a last gate or transfer gate electrode 40, is between each column of pixels in the sensing region and the associated transfer cell 26 of the readout register. However, this is conventional and is not relevant to the invention, and therefore will not be described further.

As charge packets are shifted from the readout register into the floating diffusion 30, the potential of the input terminal of the amplifier 34 varies in accordance with the size of the charge packets. In this manner, the variation along the wavelength axis in size of charge packets is converted to a time-varying voltage signal.

The output signal of the amplifier 34 is applied to processing circuitry (not shown) for extracting information from the signal. Generally, the readout amplifier 34 is fabricated on the same die as the CCD 10, but the processing circuitry is not.

Figures 3, 4:
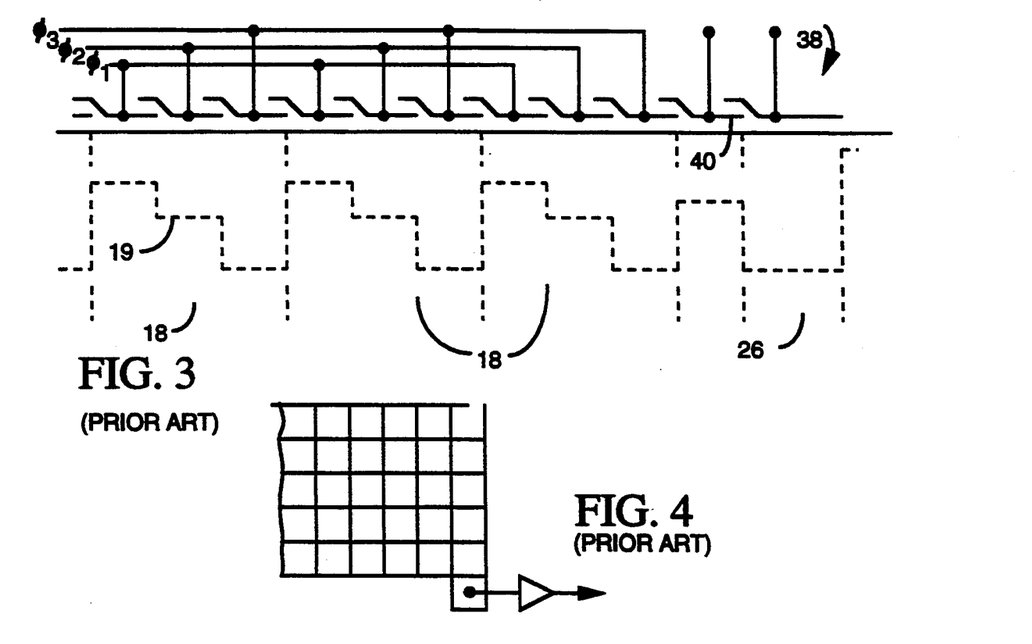
FIG. 3 is a partial sectional view of the CCD shown in FIG. 2, illustrating variation in potential in a segment of one column of pixels and the associated transfer cell of the readout register.
FIG. 4 is a plan view of a second CCD for spectroscopic detection.

As shown in FIG. 4, the readout register could extend in the direction perpendicular to the wavelength axis, with each column of pixels being clocked sequentially into the readout register and then accumulated in the floating diffusion at the end of the readout register. This is subject to disadvantage unless a shutter is used to prevent illumination of the array during readout, because charge accumulated during the readout operation is not added on a wavelength basis to the charge accumulated prior to the readout operation.

A typical silicon die that is processed to form a CCD has a thickness of about 0.1 mm and the sensing region extends to a depth of about 10 um below the surface at which the die is processed to form the CCD. The frame electrode structures lie over this surface, which is commonly known as the front side of the die.

If the optical signal is incident on the sensing region by way of the front side of the die, the optical signal is partially blocked by the frame electrode structure. In application of a CCD to imaging very faint optical signals, for example astronomical applications, it is known to thin the die from the back side and illuminate the CCD from the back side of the die in order to avoid this problem.

The minimum noise level of an optical signal is the photon shot noise, which is the square root of the mean number of photons in the optical signal. Similarly, when the optical signal is converted to an electrical signal using a CCD, the noise level is at least the square root of the mean number of photoelectrons in the signal. Thus, to measure the electrical output signal of the CCD to a precision of 1 part in 1,000 requires that the signal be composed of at least 1 million photoelectrons, because the minimum noise of a 1 million electron signal is 1,000 electrons, or 1 part in 1,000 of the signal. Another source of noise in the output signal of the CCD is the noise that is generated in the readout process itself.

In CCDs that are currently used for spectroscopic detection, the charge capacity of the readout register is not significantly greater than the charge capacity of the sensing region. This imposes a limit on the number of electrons in the signal provided by the readout register, so that the signal to noise ratio cannot be increased by making multiple exposures and accumulating the charge packets in the transfer cells prior to readout.

A problem that arises in manufacture of integrated circuits in general and CCDs in particular is that of yield. If multiple devices are fabricated under nominally identical conditions and to nominally identical designs, a significant proportion of the finished devices will not function to specifications. Generally, the number of faulty devices will depend on the complexity of the design, since as complexity increases, tolerances normally decrease.

SUMMARY OF THE INVENTION

In accordance with a first aspect of the present invention there is provided a CCD comprising a sensing array, a readout register extending adjacent an edge of the sensing array, and an output cell at an output end of the readout register, said output cell having first and second sub-cells with the first sub-cell being between the readout register and the second sub-cell, the first sub-cell of the output cell being of lower capacity than the second sub-cell and being separated from the second sub-cell by a potential barrier.

In accordance with a second aspect of the present invention there is provided a CCD apparatus comprising: a sensing array, a readout register means adjacent an edge of the sensing array, wherein the readout register means has first and second rows of transfer cells, the first row being between the sensing array and the second row, and the transfer cells of the first row are separated from the transfer cells of the second row by a potential barrier, a frame electrode means operative for shifting charge from the sensing array to the readout register means, a readout electrode means operative for transferring charge in the readout register means to an output end of the readout register means, a first amplifier connected to detect charge transferred to the output end of the readout register means by the first row, and a second amplifier connected to detect charge transferred to the output end of the readout register means by the second row, and a summing means for forming a weighted sum of output signals of the first and second amplifiers.

In accordance with a third aspect of the present invention there is provided CCD apparatus comprising a sensing array, first and second readout registers, and an amplifier means for detecting charge accumulated in the first and second registers, the amplifier means comprising a first amplifier connected to detect charge accumulated by the first register, a second amplifier connected to detect charge accumulated by the second register, and a summing means for additively combining an output signal provided by the first amplifier with an output signal provided by the second amplifier, and wherein the first amplifier has a greater sensitivity than the second amplifier.

BRIEF DESCRIPTION OF THE DRAWINGS

For a better understanding of the invention, and to show how the same may be carried into effect, reference will now be made, by way of example, to the accompanying drawings in which.

DETAILED DESCRIPTION

Figure 5:
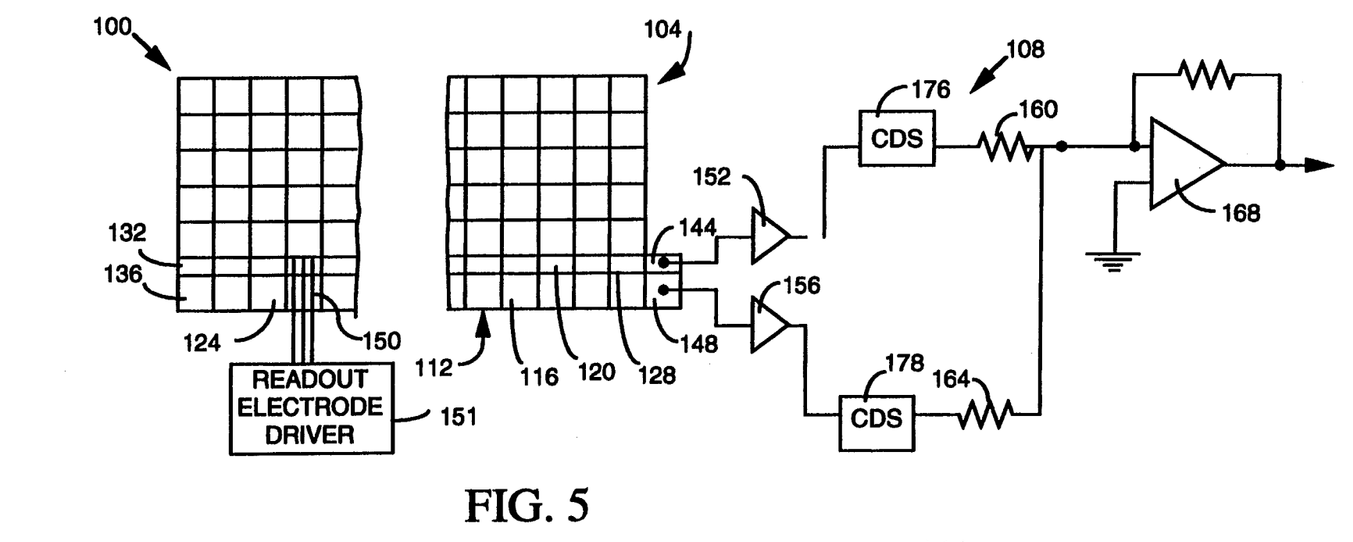
FIG. 5 is a schematic plan view of a first CCD apparatus embodying the present invention, comprising a CCD and a detection circuit.

FIG. 5 shows CCD apparatus comprising a CCD 100 and a detection circuit 108. The CCD 100 has a sensing region 104, composed of a rectangular array of photosensitive pixels 108, and a readout register 112 along one of the longer edges of the sensing region. It is preferred that the CCD be a thinned CCD that is illuminated from the back side. The readout register comprises a row of transfer cells 116, each comprising two wells or sub-cells 120 and 124 separated by a potential barrier 128 (see also FIG. 6). Thus, the readout register comprises a row 132 of wells 120 and a row 136 of wells 124. The charge capacity of the well 120 is substantially less than the charge capacity of the well 124. This is illustrated schematically in FIG. 6 by showing the well 120 as having substantially the same potential depth as the well 120 but being substantially narrower than the well 124.

Figure 6:
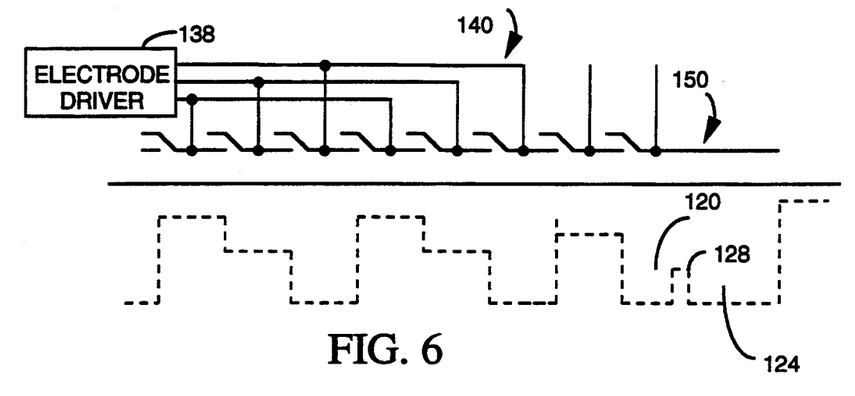
FIG. 6 is a partial sectional view of the CCD that forms part of the apparatus shown in FIG. 5, illustrating variation in potential in a segment of one column of pixels and the associated transfer cell of the readout register.

Referring to FIG. 6, a three-phase frame electrode structure 140 overlies the front side of the sensing region and is connected to a three-phase frame electrode driver 138. By employing the electrode driver 138 to apply appropriate potentials to the frame electrode structure, pixel charges are shifted progressively into the associated wells 120 of the readout register. If the charge packet that is shifted into a well 120 from the corresponding column of the sensing region is large enough, it fills the well 120 and excess charge overflows from that well into the well 124. In this manner, a large charge packet may be divided into two sub-packets in the wells 120 and 124 respectively.

Floating diffusions 144 and 148 are provided at an output end of the rows 132 and 136 respectively. A three-phase readout electrode structure 150 overlies the readout register and is driven by a three-phase readout electrode driver 151 to shift the charge packets parallel to the wavelength axis toward the output end of the readout register where they enter the floating diffusions 144 and 148. A detection circuit 108 detects charge entering the floating diffusions 144, 148. The detection circuit 108 comprises two readout amplifiers 152 and 156, which provide voltage signals representative of the level of charge in the floating diffusions 144 and 148 respectively.

Since the wells 120 are quite small, the row 132 of the readout register has relatively high sensitivity, in that each additional electron that is shifted into a well of the first row (before that well overflows into the associated well of the second row) influences the charge sensed by the amplifier 152.

Figure 7A:
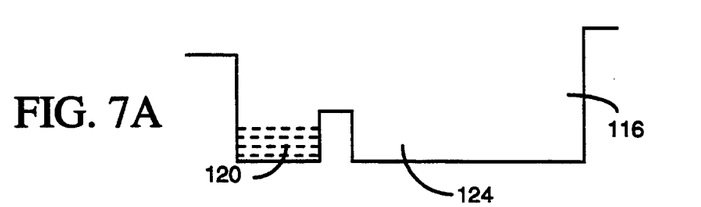
FIGS. 7A-7D are graphs illustrating operation of the readout register of the CCD shown in FIG. 5 at various signal levels.
Figure 7B:
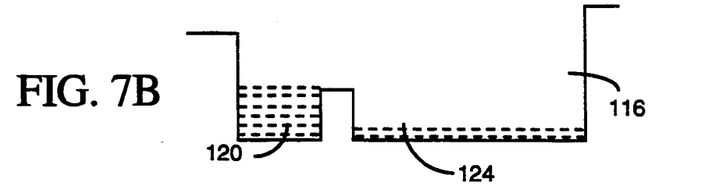
Figure 7C:
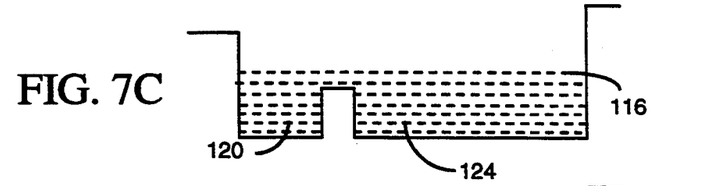
Figure 7D:
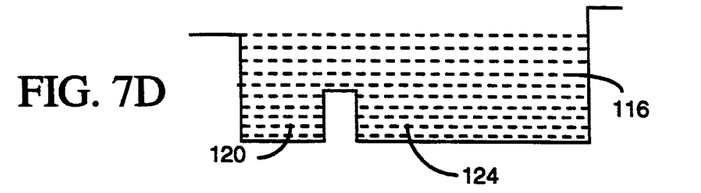
Figure 8:
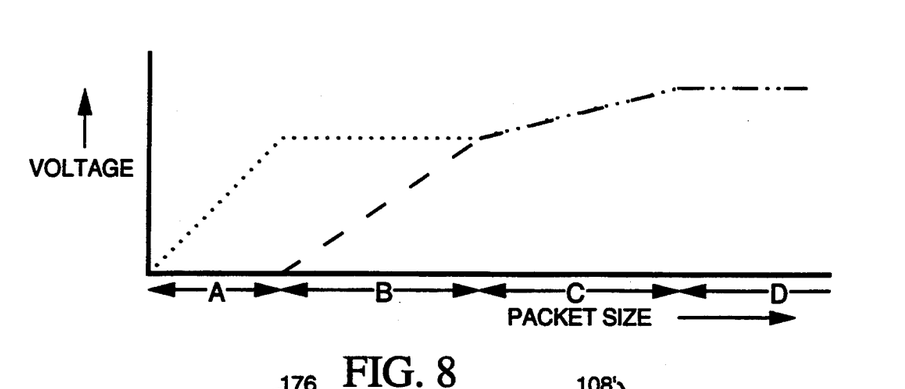
FIG. 8 is a graph illustrating a feature of operation of the CCD shown in FIG. 5.

Operation of the dual sensitivity readout register has four distinct ranges. At low signal levels (FIG. 7A and range A in FIG. 8), the charge packet that is accumulated in a transfer cell 116 by shifting the pixel charges of the associated column of the sensing region into the transfer cell is fully accommodated in the well 120. Each additional electron that enters the cell 116 remains in the well 120 and when the charge packet reaches the floating diffusion 144, the presence of the additional electron influences the voltage at the input of the readout amplifier 152. Thus, referring to the dotted line in FIG. 8, over the range A the slope of the curve relating the voltage detected at the input of the amplifier 152 to packet size is fairly high. At somewhat higher signal levels (FIG. 7B and range B in FIG. 8), the charge packet is sufficient to fill the well 120, and excess charge transferred into the cell 116 overflows into the well 124. The voltage at the input of the amplifier 152 remains constant and each additional electron that enters the cell 116 affects only the potential level in the well 124. Since the floating diffusion 148 is larger than the floating diffusion 144, the slope of the curve relating voltage at the input of the amplifier 156 to packet size (the dashed line in FIG. 8) in range B is less than the slope of the dotted line in range A. When the well 124 is filled to the level of the barrier 128, as additional charge enters the cell 116 the potential in each well increases by the same amount (FIG. 7C and range C in FIG. 8). Over the range C, the slope of the voltage versus packet size curve (the dot-dashed line) is less than the slope of the dashed line in range B. Finally, when the cell 116 is full (FIG. 7D and range D in FIG. 8), introduction of additional charge has no effect on the potential in either well.

The properties of the amplifiers 152 and 156 are selected to take advantage of the fact that the sensitivity of the row 132 is greatest for low level signals and the sensitivity of the row 136 is greatest for medium level signals. Accordingly, the amplifier 152, which detects the charge in the row 132, is designed to have high gain and low noise, and therefore to amplify small charge signals without introducing substantial noise. The amplifier 156, which is associated with the row 136, has a lower gain so that it can detect a larger charge signal without distortion. Because the amplifier 156 receives larger signal charges, its noise level is inevitably higher than that of the amplifier 152. The outputs of the two readout amplifiers 152, 156 are connected to respective correlated double samplers (CDSs) 176, 178. The technique of correlated double sampling for reset noise reduction is described in J. D. E. Beynon and D. R. Lamb (Editors), CHARGE-COUPLED DEVICES AND THEIR APPLICATIONS, McGraw Hill Book Company (UK) Limited, 1980. The outputs of the CDSs 176 and 178 are connected through resistors 160 and 164 to a summing amplifier 168, which provides as its output the weighted sum of the outputs of the CDSs 176 and 178. The values of the resistors 160 and 164 are selected so that the overall gain from the readout register 116 to the output of the amplifier 168 is the same for the channel containing the row 132 and the amplifier 152 as for the channel containing the row 136 and the amplifier 156. The resistors 160 and 164 are selected so that the output of the amplifier 148 is converted to the same scale as the output of the amplifier 152.

It will be appreciated by those skilled in the art that in the CCD apparatus shown in FIG. 5, at least part of the detection circuit 108 would not normally be on the same die as the CCD 100. However, there is no reason in principle why, with improved fabrication techniques, the entire detection circuit should not be included on the same die as the CCD.

The detection circuit 108 shown in FIG. 5 is subject to disadvantage in that the noise generated by the amplifier 156 always contributes to the output of the summing amplifier 168. Accordingly, it is desirable to include a switch 170 (FIG. 5A) between the resistor 164 and the node 172 to allow the amplifier 156 to be disconnected. The switch is under operator control, so that for large signal operation (beyond range A in FIG. 8) the operator can close (render conductive) the switch and the output signal of the amplifier 156 will then contribute to the output of the summing amplifier 168. Alternatively, for small signal operation (range A), the operator can leave the switch open (non-conductive) and the noise generated by the amplifier 156 will be isolated from the summing amplifier 168.

Figure 9:
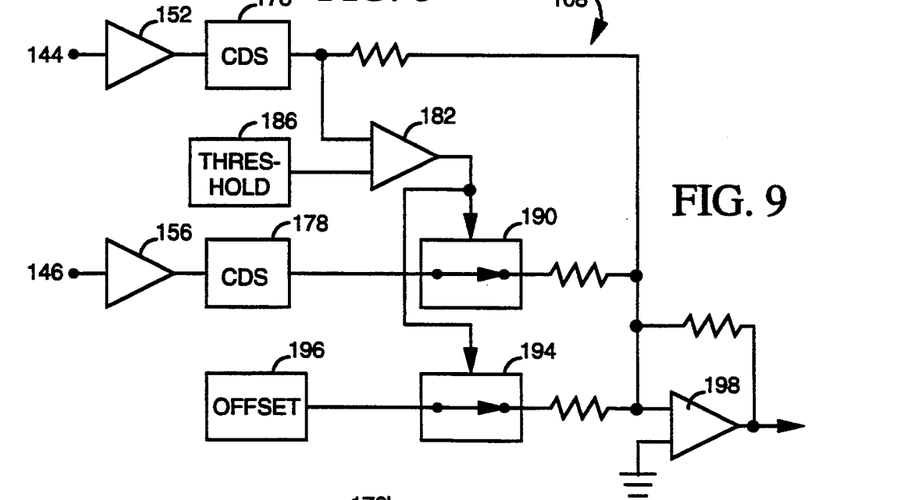
FIG. 9 is a schematic diagram of a modified form of the detection circuit shown in FIG. 5.

FIG. 9 illustrates a modified form of the detection circuit. The detection circuit 108' shown in FIG. 9 comprises readout amplifiers 152 and 156 connected to the floating diffusions 144 and 148 respectively and CDSs 176 and 178 receiving the outputs of the amplifiers 152 and 156 respectively, as in the case of FIG. 5. The output of the CDS 176 is connected to a comparator 182 that compares the output of the CDS 176 to a predetermined threshold level provided by a circuit 186. If the threshold level is exceeded, the comparator 182 closes two analog switches 190, 194, whereby the output of the CDS 176 is summed by a summing amplifier 198 with the output of the CDS 178 and an offset constant provided by a constant circuit 196. If the threshold level is not exceeded, the analog switches remain open and the outputs of the amplifier 156 and the offset circuit 198 are isolated from the summing amplifier 198. The resistance values of the resistors connected to the input of the summing amplifier 198 are selected to convert the output of the CDS 178 to the same scale as the output of the CDS 176. The value of the offset constant is chosen to eliminate any step in the system response when the switch 190 is closed.

Ideally, the threshold level would be selected so that the switches 190 and 194 are closed only when the charge packet is large enough to overflow the barrier 128 (FIG. 8, range B). However, this is not a practical solution, because the barrier can not be fabricated exactly uniformly, and so the packet size at which charge flows from well 120 to well 124 will vary somewhat from stage to stage along the readout register. Therefore, the threshold level is selected so that the switches 190 and 194 are closed only when the signal from the CDS 176 is large enough that its shot noise component is significantly larger than the readout noise in the output of the CDS 178. It will be apparent to those skilled in the art that the noise contributions from the two signal channels add in quadrature when the switch 190 is conductive. When two noise sources are added in quadrature, the larger one becomes dominant if it is only a few times larger than the smaller. For example, if the larger noise source is 20 electrons rms and the smaller is 10 electrons rms, their quadrature sum is approximately 22.36 electrons, and if the larger is 30 electrons rms instead, then the quadrature sum is approximately 31.62 electrons, etc. Thus, satisfactory operation will be achieved over a wide range of threshold levels, as long as the threshold is set above the level at which the low noise channel shot noise is 2 or 3 times the high signal channel readout noise.

Figure 5A:
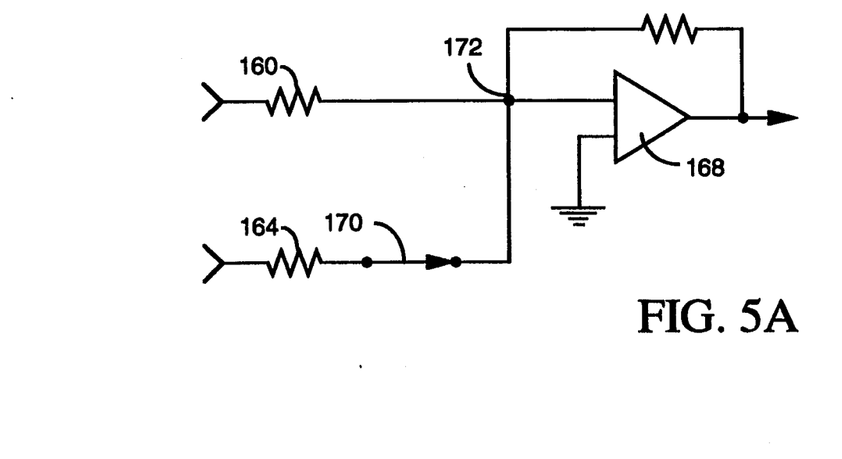
FIG. 5A shows a modification of FIG. 5.

As in the case of FIG. 5A, the switches 190 and 194 minimize the readout noise present in the output signal of the amplifier 198 when the charge signal is small enough that the range of the amplifier 152 is not exceeded. However, the circuit of FIG. 9 provides the advantage that the operation mode does not depend on the subjective judgement of the operator and allows the configuration of the detection circuit to change dynamically, on a packet by packet basis.

The dynamic range of an analog signal processing circuit is limited by the ability of the circuit to process both large and small amplitude signals. In a practical analog implementation of the detection circuit 108′, the dynamic range may be about 200,000:1. The dynamic range of a digital signal processing circuit depends exponentially on the number of bits assigned to the quantity that is represented by the digital signal. Therefore it is preferred that the operations of offsetting, scaling and summation should be performed by hardware in the digital domain. A dynamic range exceeding 1,000,000:1 is provided if the digital signals that are processed have about 20 bits.

Figure 9A:
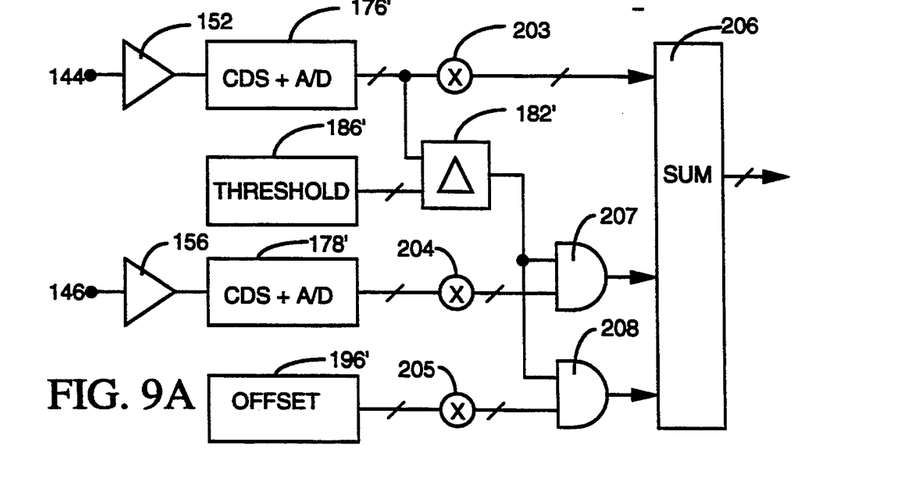
FIG. 9A is a block diagram of a digital implementation of the detection circuit shown in FIG.9.

FIG. 9A shows schematically a digital implementation of the circuit shown in FIG. 9. The output signals of the amplifiers 152, 156 are digitized and undergo correlated double sampling in blocks 176′ and 178′ respectively. The correlated double sampling may be done either in the analog domain, upstream of the digitizing operation, or in the digital domain. In either case, the blocks 176′ and 178 provide digital output signals that represent the correlated double sampled outputs of the amplifiers 152 and 156. The digital output signal of the block 176′ and a digital threshold value provided by a circuit 186′ are applied to a digital comparator 182′, which provides a logical 1 output if the digital signal provided by the block 176′ exceeds the digital threshold value. The output of the digital comparator 182′ is applied to two multi-bit AND arrays 207, 208. The outputs of the blocks 176′, 178′ and a digital offset constant provided by a constant circuit 196′ are scaled by scaling circuits 203, 204, and 205 respectively. The output of the scaling circuit 203 is applied as one input to a summation circuit 206, and the outputs of the scaling circuits 204 and 205 are applied to the AND arrays 207 and 208 respectively. The outputs of the AND arrays 207, 208 are applied as inputs to the summation circuit 206. Thus, when the output of the digital comparator 182′ is logical 1, the output signal of the summation circuit 206 constitutes the sum of the outputs of the scaling circuits 203, 204, and 205, whereas when the output of the digital comparator is logical 0, the output of the summation circuit is simply the output of the scaling circuit 203.

Figure 10:
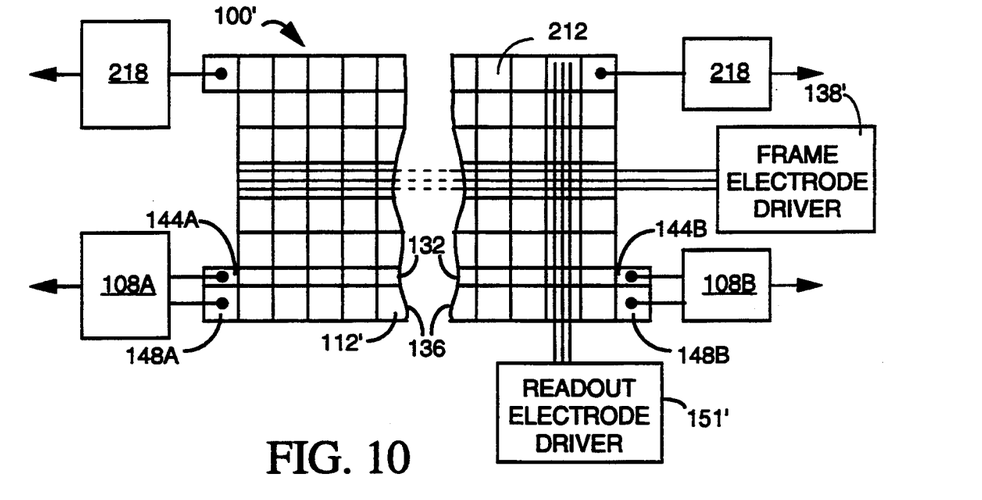
FIG. 10 is a partial plan view of a second CCD apparatus embodying the present invention.

FIG. 10 illustrates a CCD apparatus 100′ in which the readout register 112′ has floating diffusions 144A and 148A at the left end (as seen in FIG. 10) of the rows 132 and 136 respectively, and floating diffusions 144B and 148B at the right end of the rows 132 and 136. The three-phase readout electrode driver 151′ is operative selectively to shift charge packets either toward the left end of the readout register, where they enter the floating diffusions 144A and 148A, or toward the right end of the readout register where they enter the floating diffusions 144B and 148B. A detection circuit 108A detects charge entering the floating diffusions 144A, 148A and a detection circuit 108B detects charge entering the floating diffusions 144B, 148B. Each of the detection circuits 108A, 108B may be in the form of the detection circuit 108 shown in FIG. 5 or in the form of the detection circuit 108′ shown in FIG. 9. For example, the circuit 108A may be in the form of the circuit 108 shown in FIG. 4 while the circuit 108B is in the form of the circuit 108′.

The apparatus shown in FIG. 10 provides the advantage that if there should be a fault in fabrication of the CCD apparatus, such that the benefits of the detection circuit 108B cannot be realized, the simpler detection circuit 108A nevertheless provides a functional CCD apparatus for spectroscopic applications.

FIG. 10 also shows that the CCD may have a second readout register 212 at the opposite edge of the sensing region from the readout register 112′. In this case, the frame electrode driver 138′ is operative selectively to shift charge packets in the pixel columns either into the readout register 112′ or into the readout register 212. In order to maximize yield of useful devices, it is preferred that the readout register 212 should comprise a single row of transfer cells provided with a floating diffusion at each end, with each floating diffusion feeding a detection circuit 218 of conventional form. However, depending on requirements, the readout register 212 may be designed to comprise two rows of wells and be provided with two pairs of floating diffusions, one pair at each end, with each pair of floating diffusions feeding a two level charge accumulation detection circuit 218 that is similar either to the circuit 108 or to the circuit 108′. Whether a given detection circuit is in the form of the circuit 108 or in the form of the circuit 108′ depends on the desirability of the capabilities of the circuits 108 and 108′ relative to the degradation of performance that can be tolerated while still providing a useful apparatus.

Figure 11:
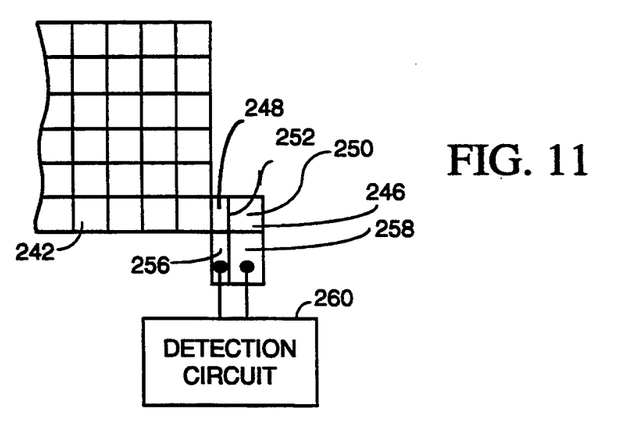
FIG. 11 is a partial plan view of a third CCD apparatus embodying the present invention.

FIG. 11 shows that two level charge accumulation is not limited to providing a CCD having a dual sensitivity readout register. In the apparatus shown in FIG. 11, the readout register 242 comprises a single row of transfer cells and there is a two level charge accumulation cell 246 at the output end of the register 242. The charge accumulation cell 246 comprises two sub-cells or wells 248, 250 separated by a potential barrier 252, and the sub-packets in the two wells respectively are shifted to respective floating diffusions 256, 258. The charge shifted into the floating diffusions is detected by means of a detection circuit 260, which may be as described above or as described in the co-pending application.

Figure 12:
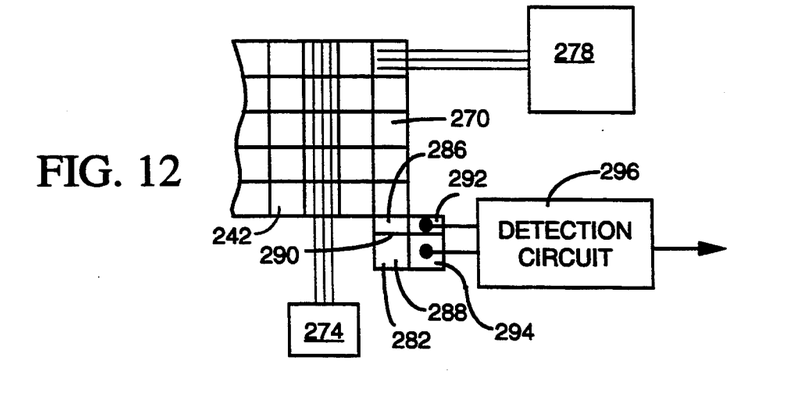
FIG. 12 is a schematic plan view of a fourth CCD apparatus embodying the present invention.

Use of a two level charge accumulation cell to receive charge packets from a single-row readout register of a CCD for spectroscopic detection is not restricted to the readout register being parallel to the wavelength axis of the sensing region. FIG. 12 illustrates application of such a two level charge accumulation cell to a CCD in which the readout register 270 is oriented as shown in FIG. 4. The frame electrode driver 274 is operated to shift the pixel charges parallel to the wavelength axis, and the readout electrode driver 278 is operated to shift the resulting packets perpendicular to the wavelength axis into a two level charge accumulation cell 282, comprising two sub-cells or wells 286, 288 separated by a potential barrier 290. As described with reference to FIG. 11, the wells 286, 288 feed respective floating diffusions 292, 294, which are coupled to a detection circuit 296.

It will be appreciated that the invention is not restricted to the particular embodiments that have been described and illustrated, and that variations may be made therein without departing from the scope of the invention as defined in the appended claims and equivalents thereof. For example, the invention is not limited to use of correlated double sampling for reducing resetting noise, and other techniques for noise reduction, such as up-down integration, may be used instead. Further, the operations of correlated double sampling, scaling, offsetting and summing, described with reference to FIG. 9, need not be performed in hardware but could be performed in software instead. Moreover, the fact that one or more of the appended claims are drawn to CCD apparatus should not be taken as implying that it is necessary to the invention that the detection circuit shown in FIG. 5 or FIG. 9, for example, not be on the same die as the sensing region of the CCD. The invention is not restricted to there being only two charge accumulation levels and two channels in the detection circuit, and is applicable also to apparatus in which the charge accumulation cell has three or more sub-cells or wells separated from each other by potential barriers, and the detection circuit has an equivalent number of channels for detecting the sub-packets accumulated in the wells respectively. Although implementation of the invention has been described in the context of three-phase electrode structures and three-phase electrode drivers, the invention is not limited to three-phase technology.

We claim:

1. A CCD comprising a sensing array, a readout register extending adjacent an edge of the sensing array and having an output end, and an output cell outside the readout register and at the output end thereof, said output cell having first and second sub-cells with the first sub-cell being between the readout register and the second sub-cell, the first sub-cell of the output cell being of lower capacity than the second sub-cell and being separated from the second sub-cell by a potential barrier.

2. A CCD according to claim 1, comprising a first amplifier connected to detect charge accumulated in the first sub-cell and a second amplifier connected to detect charge accumulated in the second sub-cell.

3. A CCD according to claim 2, wherein the first amplifier has a greater sensitivity than the second amplifier.

4. A CCD according to claim 2, further comprising a summing means for forming a weighted sum of output signals of the first and second amplifiers.

5. A CCD according to claim 4, wherein the summing means includes scaling means for scaling the output signals provided by the first and second amplifiers in accordance with a relationship between the sensitivity of the first amplifier and the sensitivity of the second amplifier.

6. A CCD according to claim 4, comprising a switch means for selectively disconnecting the second amplifier from the summing means.

7. A CCD according to claim 2, comprising a comparator means for comparing the output signal level of the first amplifier with a predetermined threshold level, a summing means for summing the output signal of the first amplifier with the output signal of the second amplifier, and a switch means responsive to the comparator for disconnecting the output of the second amplifier from the summing means in the event that the output signal level of the first amplifier is below the predetermined threshold level.

8. A CCD according to claim 7, comprising offset adjustment means for providing an offset signal to the summing means, and a second switch means responsive to the comparator means for disconnecting the offset adjustment means from the summing means in the event that the output signal level of the first amplifier is below the predetermined threshold level.

9. A CCD apparatus comprising:
a sensing array,
a readout register means adjacent an edge of the sensing array, wherein the readout register means has first and second rows of transfer cells, the first row being between the sensing array and the second row, and the transfer cells of the first row are separated from the transfer cells of the second row by a potential barrier,
a frame electrode means operative for shifting charge from the sensing array to the readout register means,
a readout electrode means operative for transferring charge in the readout register means to an output end of the readout register means,
a first amplifier connected to detect charge transferred to the output end of the readout register means by the first row, and a second amplifier connected to detect charge transferred to the output end of the readout register means by the second row, and
a summing means for forming a weighted sum of output signals of the first and second amplifiers.

10. CCD apparatus according to claim 9, wherein the summing means includes scaling means for scaling the output signals provided by the first and second amplifiers in accordance with a relationship between the sensitivity of the first amplifier and the sensitivity of the second amplifier.

11. CCD apparatus according to claim 9, comprising a switch means for selectively disconnecting the second amplifier from the summing means.

12. CCD apparatus according to claim 9, comprising a comparator means for comparing the output signal level of the first amplifier with a predetermined threshold level, a summing means for summing the output signal of the first amplifier with the output signal of the second amplifier, and a switch means responsive to the comparator for disconnecting the output of the second amplifier from the summing means in the event that the output signal level of the first amplifier is below the predetermined threshold level.

13. CCD apparatus according to claim 12, comprising offset adjustment means for providing an offset signal to the summing means, and a second switch means responsive to the comparator means for disconnecting the offset adjustment means from the summing means in the event that the output signal level of the first amplifier is below the predetermined threshold level.

14. CCD apparatus comprising a sensing array, first and second readout separated by a potential barrier, and an amplifier means for detecting charge accumulated in the first and second registers, the amplifier means comprising a first amplifier connected to detect charge accumulated by the first register, a second amplifier connected to detect charge accumulated by the second register, and a summing means for additively combining an output signal provided by the first amplifier with an output signal provided by the second amplifier, and wherein the first amplifier has a greater sensitivity than the second amplifier.

15. CCD apparatus according to claim 14, wherein the summing means includes scaling means for scaling the output signals provided by the first and second amplifiers in accordance with a relationship between the sensitivity of the first amplifier and the sensitivity of the second amplifier.

16. CCD apparatus according to claim 14, comprising a switch means for selectively disconnecting the second amplifier from the summing means.

17. CCD apparatus according to claim 14, comprising a comparator means for comparing the output signal level of the first amplifier with a predetermined threshold level, and a switch means responsive to the comparator means for disconnecting the output of the second amplifier from the summing means in the event that the output signal level of the first amplifier is below the predetermined threshold level.

18. CCD apparatus according to claim 17, comprising an offset adjustment means for providing an offset signal to the summing means, and a second switch means responsive to the comparator means for disconnecting the offset adjustment means from the summing means in the event that the output signal level of the first amplifier is below the predetermined threshold level.

19. CCD apparatus according to claim 14, comprising analog-to-digital converter means for converting the output signals provided by the first and second amplifiers to first and second digital signals respectively, and wherein the summing means comprises a digital summing means.

20. CCD apparatus according to claim 19, wherein the summing means includes a scaling means for scaling the digital signals provided by the analog-to-digital converter means in accordance with a relationship between the sensitivity of the first amplifier and the sensitivity of the second amplifier.

21. CCD apparatus according to claim 19, comprising a means for selectively disabling the input of the summing means from receiving the second digital signal provided by the analog-to-digital converter means.

22. CCD apparatus according to claim 19, comprising a digital comparator means for comparing the first digital signal provided by the analog-to-digital converter means with a predetermined threshold level and a disabling means responsive to the digital comparator means for selectively disabling the summing means from adding the second digital signal to the first digital signal in the event that the first digital signal is below the predetermined threshold value.

23. CCD apparatus according to claim 22, comprising an offset adjustment means for providing a digital offset signal to the summing means, and a second disabling means responsive to the digital comparator means for selectively disabling the summing means from adding the offset signal to the first digital signal in the event that the first digital signal is below the predetermined threshold level.

* * * * *

UNITED STATES PATENT AND TRADEMARK OFFICE
CERTIFICATE OF CORRECTION

PATENT NO. : 5,432,335
DATED : July 11, 1995
INVENTOR(S) : John S. WEST et al

It is certified that error appears in the above-indentified patent and that said Letters Patent is hereby corrected as shown below:

Column 11, Claim 14, line 2, after "readout" insert --registers--.

Signed and Sealed this

Thirty-first Day of October 1995

Attest:

BRUCE LEHMAN

Attesting Officer

Commissioner of Patents and Trademarks